INVENTORS
OLIVER K. KELLEY
GILBERT K. HAUSE
BY Craig V. Morton
THEIR ATTORNEY

United States Patent Office 2,832,428
Patented Apr. 29, 1958

2,832,428

BRAKE COOLING SYSTEM

Oliver K. Kelley, Bloomfield Hills, and Gilbert K. Hause, Franklin, Mich., assignors to General Motors Corporation, Detroit, Mich., a corporation of Delaware Application December 19, 1955, Serial No. 553,889

9 Claims. (Cl. 180—54)

This invention relates to a system for circulating a cooling fluid through friction brakes of a motor vehicle.

The motor vehicle is adapted to be provided with a friction brake through which a liquid is circulated by means of a pump to provide for forced cooling of the brake during actuation of the brake, thereby to remove heat of friction created by the braking action. The liquid that is circulated through the brake is received by the pump from a suitable source of cooling fluid, the pump delivering the cool fluid under pressure into the brake for circulation therethrough, whereby to pick up the heat of friction created within the brake. The liquid that is circulated through the brake by the pump is then delivered to a heat exchange apparatus in which the now heated fluid is cooled for subsequent return to the pump and circulation through the brake.

On many of the currently manufactured vehicles there is provided a hydrokinetic torque transfer mechanism by which the driving energy from an engine on the motor vehicle is transmitted to the drive wheels of the vehicle. These hydrokinetic torque transfer mechanisms are known under many names such as torque convertors, fluid drives, hydraulic couplings and others but primarily comprise a mechanism in which a body of oil is circulated between an impeller driven by the engine of the vehicle and a rotor that is connected with the drive shaft of the vehicle whereby the kinetic energy of the oil circulated within a torous by action of the impeller causes the rotor to follow the rotation of the impeller and thereby drive the vehicle. In such mechanisms there is provided a liquid circulating system by which liquid is circulated through the hydrokinetic transfer mechanism and directed to a heat exchange device for the purpose of cooling the liquid and thereby maintaining the liquid within the hydrokinetic transfer mechanism to a relatively low temperature, and prevent overheating of the liquid within the mechanism which would result in the event of a high degree of slip between the impeller and the rotor.

It is an object of this invention to provide a system for liquid cooling of the friction brakes on a motor vehicle that also has a hydrokinetic torque transfer mechanism for driving the vehicle in which the heat transfer device for cooling the liquid circulated through the hydrokinetic torque transfer mechanism is used to cool the liquid circulated through the friction brakes of the motor vehicle to effect cooling of the brakes, the heat transfer device for the torque transfer mechanism effecting a cooling of fluid that is common to the friction brakes and the torque transfer mechanism for the vehicle.

It is also an object of the invention to provide a system for liquid cooling of friction brakes for a motor vehicle wherein there is provided pump means for effecting forced circulation of cooling fluid through the friction brakes of the vehicle with the circulatory system for the friction brakes being connected with the fluid circulatory system for a hydrokinetic torque transfer mechanism adapted for driving the vehicle, the two systems thus utilizing a common cooling fluid with each system being provided with pump means for effecting independent circulation within the individual systems.

It is another object of the invention to provide a system in accordance with the foregoing object wherein the conduit means that interconnects the circulatory cooling system for the friction brakes of the vehicle and the circulatory system for circulating fluid through the hydrokinetic torque transfer mechanism of the vehicle includes a control means providing for a continuous limited flow of fluid from the circulatory system of the torque transfer mechanism into the circulatory system for the friction brakes with the result that the pump means in the circulatory system for the friction brakes is maintained in a primed condition for instant response when actuated, and further control means is provided in the interconnecting conduit system by which the first mentioned control means is by-passed to allow the pump means in the circulatory system for the friction brakes to receive its full flow capacity from the circulatory system for the torque transfer mechanism to cool the friction brakes when they are activated.

Further objects and advantages of the present invention will be apparent from the following description, reference being had to the accompanying drawings wherein a preferred form of the invention is clearly shown.

Figure 1:
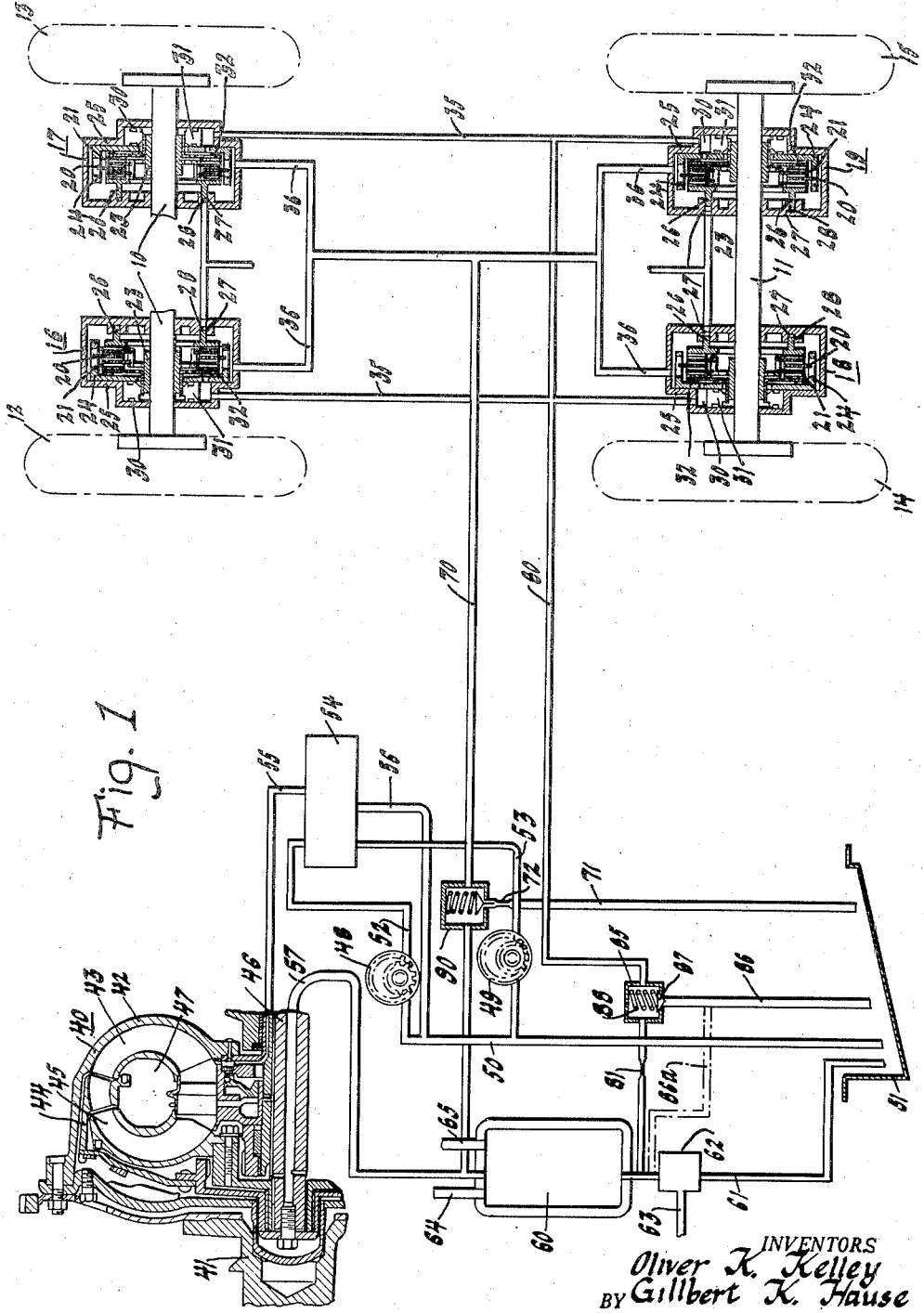
Figure 1 is a schematic illustration of a brake cooling system incorporating features of this invention.
Figure 2:
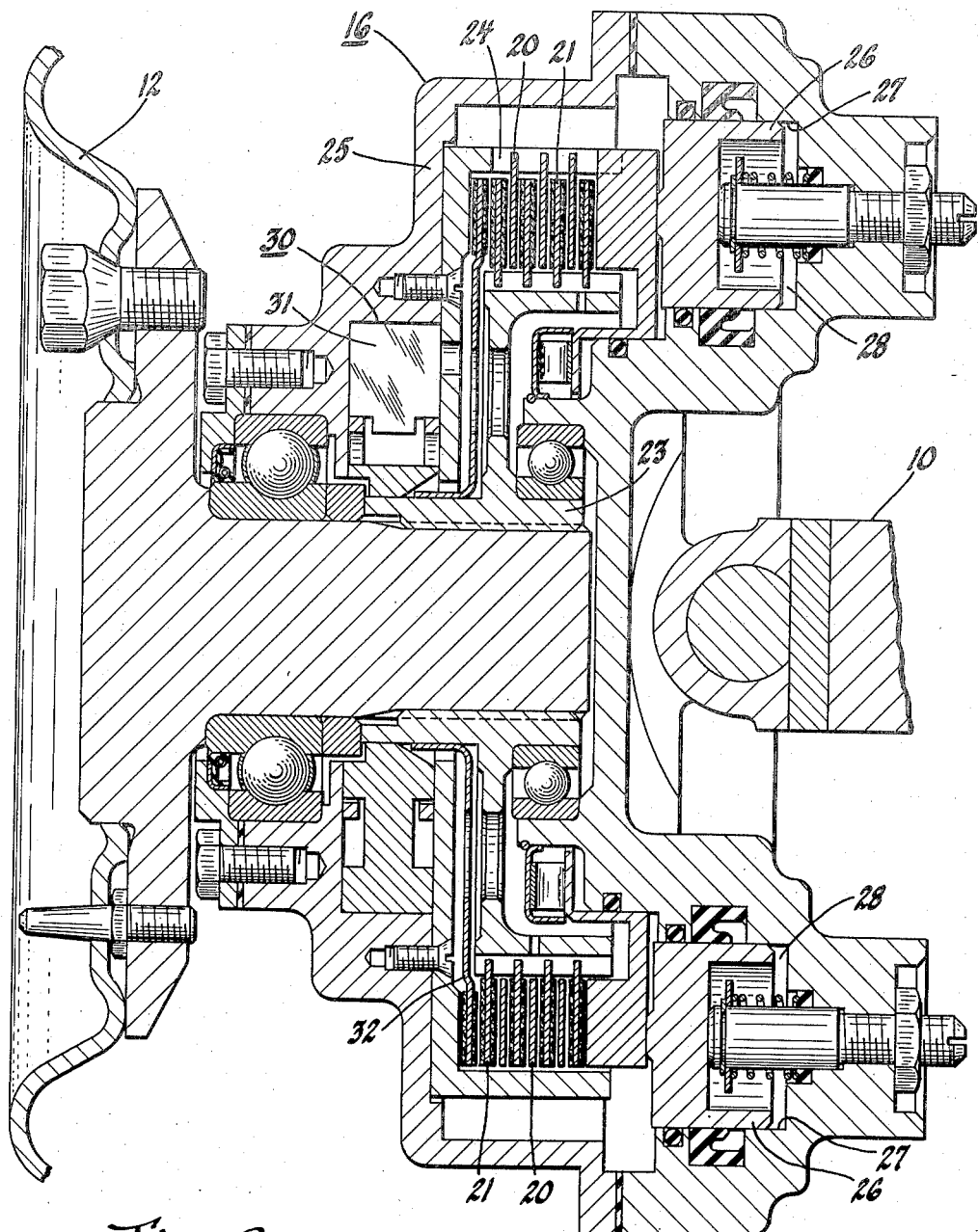
Figure 2 is a transverse cross sectional view illustrating one of the brakes shown schematically in Figure 1.

In the drawings there is illustrated a schematic system arrangement adapted for use on a motor vehicle wherein a circulatory liquid cooling system for the brakes of the motor vehicle are interconnected with a fluid circulatory system for a hydrokinetic torque transfer mechanism to provide for the use of a common fluid in the two systems and a single heat exchange apparatus for removing heat from the fluid circulated in either of the systems.

The motor vehicle may consist of a pair of axles 10 and 11 supporting the usual wheels 12 and 13 on the axle 10 and the wheels 14 and 15 on the axle 11. The wheels 12 and 13 are provided with friction brakes 16 and 17 respectively while the wheels 14 and 15 are provided with friction brakes 18 and 19 respectively. The friction brakes 16, 17, 18 and 19 may be of the type more fully disclosed and described in our copending application S. N. 504,528 filed April 28, 1955. The friction brakes each include a plurality of stationary disks 20 and rotatable disks 21 that provide a disk stack or assemblage to effect braking of the wheel with which the brake is associated. The rotatable disks 21 are carried upon a hub 23 that is carried on the axle 10 or 11 respectively. The stationary disks 20 are carried upon a spline connection 24 secured to the brake housing 25 whereby the disks 20 are retained stationary relative to the rotating disks 21.

A piston 26 is slidably disposed in a cylinder 27 thereby providing an hydraulic chamber 28 that receives hydraulic fluid from the master cylinder of a brake actuating system (not shown), the master cylinder being adapted for operation by a conventional brake pedal provided in the passenger compartment of a motor vehicle.

Each of the brakes 16, 17, 18 and 19 may be provided with a fluid pump of the vane type 30. The vanes 31 of the pump 30 are connected with a driven disk 32 that is normally stationary, but which is caused to rotate by engagement with the rotatable disks 21 when the brake is actuated. Rotation of the disk 32 effects rotation of the vanes 31 of the pump to cause the pump to circulate liquid through the respective brakes.

The pumps 30 for each of the wheel brakes 16, 17, 18 and 19 receive liquid through the supply conduits 35 and discharge liquid under pressure within the brake housing 25 for circulation between the rotatable and stationary brake disks 20, 21 to effect cooling of the disks when they are effecting a brake operation, as more specifically disclosed and described in the heretofore mentioned application, S. N. 504,528.

The liquid circulated through the disk assemblage 20, 21 is exhausted into the discharge lines 36 for circulation through a heat exchange device for cooling that it might be returned to the brakes in a cool condition.

The liquid circulatory system for the friction brakes 16, 17, 18 and 19 is connected with the fluid circulatory system for a hydrokinetic torque transfer mechanism 40 that is adapted to transfer the engine torque to the drive shaft for the motor vehicle, in a manner hereinafter described. The torque transfer mechanism is connected with the engine flywheel through a shaft connection 41, the flywheel connection 41 being connected with the impeller 42 that is provided with a plurality of arcuate vanes 43 internally thereof. A rotor or runner 44 is provided with a plurality of arcuate vanes 45 similar to the vanes 43, the runner 44 and the impeller 42 forming a torous internally thereof in which oil is forcibly driven from the impeller 42 into the runner 44 to drive the runner. The runner 44 is suitably secured to an output shaft 46 for delivering the engine torque to the wheels of the vehicle.

The torous cavity 47 provided between the impeller 42 and the runner 44 is supplied with oil under pressure by means of two pumps 48 and 49, the pump 48 being drivingly connected with the engine shaft for rotation whenever the engine is operating and the pump 49 is connected with the output shaft 46 so as to effect operation of the pump whenever the rear wheels of the motor vehicle rotate. The two pumps 48 and 49 are connected in parallel with their suction supply line 50 being connected with an oil sump or reservoir 51. The high pressure discharge lines 52 and 53 from the pumps 48 and 49 deliver the output of the pumps into a pressure regulating valve 54 that regulates the pressure of the oil delivered into the torous cavity 47 of the torque transfer mechanism by way of the supply line 55. Fluid in excess of that required to maintain a pressure of predetermined value in the torque convertor supply line 55 is by-passed to the suction side of the pumps 48 and 49 by way of a by-pass line 56.

The oil delivered into the torous cavity 47 of the torque transfer mechanism is exhausted through the discharge line 57 for return to a heat exchange device 60 in which the oil is cooled and then returned to the oil reservoir or sump 51 by way of the return line 61. A pressure regulating valve 62 is provided in the conduit 61 between the oil cooler 60 and the sump or reservoir 51 by which oil under pressure is delivered through the line 63 to the torque transfer mechanism for lubrication of certain parts and bearings thereof.

The heat transfer mechanism 60 is provided with a supply line 64 and a discharge line 65 by which coolant is circulated through the heat exchange device for cooling the oil passing through the device. Preferably the coolant is water which is adapted to be circulated from the radiator of the motor vehicle.

The liquid circulatory system for the friction brakes 16, 17, 18 and 19 heretofore described and the liquid circulatory system for the hydrokinetic torque transfer mechanism just described are interconnected by means of the conduits 70 and 80, the conduit 70 connecting the high temperature discharge line 36 from the friction brakes with the inlet line 57 to the heat exchange device 60, while the conduit 80 connects the outlet line 61 from the heat exchange device 60 with the supply lines 35 to the pumps 30 in the respective friction brakes. Thus the interconnecting conduit lines 70 and 80 provide for an interconnection of the two circulatory systems by which a common fluid or liquid is utilized in the two systems and the heat exchange device 60 in the circulatory system for the torque transfer mechanism is utilized as a common heat exchange device for the two circulatory systems.

It is preferable, when the friction brakes are inactive, to provide only for a limited volume of oil or liquid circulation from the circulatory system for the torque transfer mechanism to the circulatory system for the friction brakes, and thereby leave the circulatory system for the torque transfer mechanism relatively independent of the circulatory system for the friction brakes. For this purpose, a control means in the form of a restriction or orifice 81 is provided in the supply line 80 to limit the volume of liquid flow from the circulatory system for the torque transfer mechanism into the circulatory system for the friction brakes. The return line 70 from the circulatory system for the friction brakes is connected with the sump or reservoir 51 by means of a by-pass line 71 in which there is placed a resistance or orifice 72 that is of less resistance than the orifice 81 so that the limited volume of liquid circulating from the circulatory system for the torque transfer mechanism may return directly to the sump or reservoir 51 without passing through the heat exchange device 60. This limited flow of liquid will maintain a slight pressure in the suction side of the pumps 30 by which they are constantly primed for instantaneous action when they are activated by engagement of the brake disk assemblage 20, 21 with the drive disk 32 that effects operation of the pump 30.

When the friction brakes are applied, the full volume flow of the pumps 30 will be required to effect sufficient volume flow of liquid through the disk assemblage 20, 21 to remove the heat of friction created by the brake application, the volume of flow being required being greatly in excess which would be permitted to pass through the control means 81. For this reason a second control valve 85 is provided in the supply line 80 that is connected with the sump 51 by means of the conduit 86. The valve 85 has a valve member 87 normally retained in closed position, as illustrated, by means of the compression spring 88. However, when the pumps 30 in the friction brakes call for supply of a large volume of fluid, the valve 85 will open to allow fluid to be drawn directly from the sump or reservoir 51 through the line 86 and the supply line 80 into the suction side of the pump and thus by-pass the control means 81 that limits the flow of fluid from the circulatory system for the torque transfer mechanism during periods of inactivity of the brakes.

When the pumps 30 are rendered active by a brake application, the volume of liquid delivered into the return line 70 is such as will close a control valve 90 provided in the return line 70, thereby cutting off the by-pass line 71 and directing the full volume of liquid being discharged from the friction brakes into the heat exchange device 60, which circulatory system will be maintained until the brakes are released and the pumps 30 are aagin rendered inactive.

If desired, the supply line 86 can be connected directly with the heat exchange device 60 by way of a conduit line 86a and thereby by-pass the reservoir 51 during the period when maximum volume of liquid at minimum low temperature is required for delivery into the friction brakes for removing heat of friction created therein.

While the form of embodiment of the invention as herein disclosed constitutes a preferred form, it is to be understood that other forms might be adopted as may come within the scope of the claims which follow.

What is claimed is as follows:

1. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means having fluid circulatory system connection with said brake means to provide for liquid circulation through the brake means for cooling thereof, and conduit means connecting said first mentioned system with said second mentioned system to effect circulation of fluid between the heat exchange device of the first system and the brake means of the second system.

2. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means having fluid circulatory system connection with said brake means to provide for liquid circulation through the brake means for cooling thereof, and conduit means connecting said first mentioned system with said second mentioned system providing thereby for a common fluid in the said systems to effect circulation of the common fluid through the heat exchange device of the first system and through the brake means of the second system.

3. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means having fluid circulatory system connection with said brake means to provide for liquid circulation through the brake means for cooling thereof, conduit means connecting said first mentioned system with said second mentioned system to effect circulation of fluid between the heat exchange device of the first system and the brake means of the second system, control means in said conduit means providing for limited volume flow of fluid from said first system to said second system, and other control means in said conduit means providing a liquid flow by-pass of said first control means to provide for full pump volume flow of heat exchange cooled fluid through said brake means by the said other pump means.

4. System apparatus in accordance with claim 3 in which said other control means is actuated in response to actuation of said brake means to open said liquid flow by-pass.

5. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means rendered active with actuation of the said brake means and having fluid circulatory connection with said brake means to effect liquid circulation through the brake means for cooling thereof, conduit means connecting said first mentioned system with said second mentioned system to effect circultaion of fluid between the heat exchange device of the first system and the brake means of the second system, control means in the said conduit means providing for limited volume flow of fluid from said first system to said second system during inactivity of the said brake means, and other control means actuated in response to actuation of said brake means to open flow passage means providing for full pump volume flow of heat exchanged cooled fluid through said brake means by the said other pump means during actuation of said brake means.

6. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means having fluid circulatory system connection with said brake means to provide for liquid circulation through the brake means for cooling thereof, conduit means connecting said first mentioned system on the exhaust side of said heat exchange device with the inlet side of said other pump means of said second mentioned system to effect circulation of fluid from the heat exchange device of the first system to the brake means of the second system, and conduit means connecting the exhaust side of said brake means with the inlet side of said heat exchange device.

7. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means having fluid circulatory system connection with said brake means to provide for liquid circulation through the brake means for cooling thereof, conduit means connecting said first mentioned system on the exhaust side of said heat exchange device with the inlet side of said other pump means of said second mentioned system to effect circulation of fluid from the heat exchange device of the first system to the brake means of the second system, conduit means connecting the exhaust side of said brake means with the inlet side of said heat exchange device, control means in said first mentioned conduit means providing for limited flow of fluid from said first system to said second system continuously, and other control means in said first mentioned conduit means providing a liquid flow by-pass of said first control means connected with the inlet side of said other pump means to provide for full pump volume flow of heat exchange cooled fluid through said brake means by the said other pump means.

8. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means having fluid circulatory system connection with said brake means to provide for liquid circulation through the brake means for cooling thereof, conduit means connecting said first mentioned system on the exhaust side of said heat exchange device with the inlet side of said other pump means of said second mentioned system to effect circulation of fluid from the heat exchange device of the first system to the brake means of the second system, conduit means connecting the exhaust side of said brake means with the inlet side of said heat exchange device, control means in said first mentioned conduit means providing for limited flow of fluid from said first system to said second system continuously, other control means in said first mentioned conduit means providing a liquid flow by-pass of said first control means connected with the inlet side of said other pump means to provide for full pump volume flow of heat exchange cooled fluid through said brake means by the said other pump means, and additional control means in said second mentioned conduit means open during inaction of the brake means to effect by-pass flow of said heat exchange device by the said limited flow and closed during action of said brake means to direct the full discharge of fluid from the brake means to said heat exchange device.

9. System apparatus in accordance with claim 8 in which said additional control means in closed in response to volume flow of fluid through the same in excess of said limited volume flow.

References Cited in the file of this patent

UNITED STATES PATENTS

| | | |
|---|---|---|
| 2,152,489 | Lamb | Mar. 28, 1939 |
| 2,363,977 | Kucher | Nov. 28, 1944 |
| 2,712,876 | Kuehn | July 12, 1955 |

FOREIGN PATENTS

| | | |
|---|---|---|
| 711,059 | Great Britain | June 23, 1954 |